United States Patent [19]
Crooks

[15] 3,685,371
[45] Aug. 22, 1972

[54] REVERSING TRANSMISSION
[72] Inventor: James W. Crooks, 4973 N. Larkin St., Milwaukee, Wis. 53217
[22] Filed: April 5, 1971
[21] Appl. No.: 131,010

[52] U.S. Cl. ............................74/792, 192/18 R
[51] Int. Cl. ....................F16h 3/44, F16d 67/02
[58] Field of Search.....................74/792; 192/18 R

[56] References Cited

UNITED STATES PATENTS

| | | | |
|---|---|---|---|
| 1,655,679 | 1/1928 | Fawick | 74/792 |
| 2,141,209 | 12/1938 | Emrick | 74/792 |
| 2,296,519 | 9/1942 | Griswold | 74/792 |
| 3,005,360 | 10/1961 | Carlson | 74/792 |
| 3,563,114 | 2/1971 | Casale | 74/792 |

Primary Examiner—Arthur T. McKeon
Attorney—John W. Michael, Gerrit D. Foster, Bayard H. Michael, Paul R. Puerner, Joseph A. Gemignani, Robert E. Clemency, Andrew O. Riteris, Glenn A. Buse and Spencer B. Michael

[57] ABSTRACT

A reversing transmission including a planetary gear mechanism comprised of helical gears. The carrier of the ring gear forms part of the sealed enclosure for the mechanism and is connected to the output shaft through splines to thereby permit axial movement of the ring gear. A normally engaged spring biased clutch is provided between the input shaft and the ring gear carrier. A caliper brake is provided for braking and stopping of the rotation of the planetary gear cage. Because of the helical teeth of the gears, the braking will cause the ring gear carrier to move against the bias of the spring to disengage the clutch and, as the cage is brought to a stop, the direction of rotation of the ring gear and thus, the output shaft is reversed.

10 Claims, 3 Drawing Figures

INVENTOR
JAMES W. CROOKS
By Andrew O. Riteau
ATTORNEY

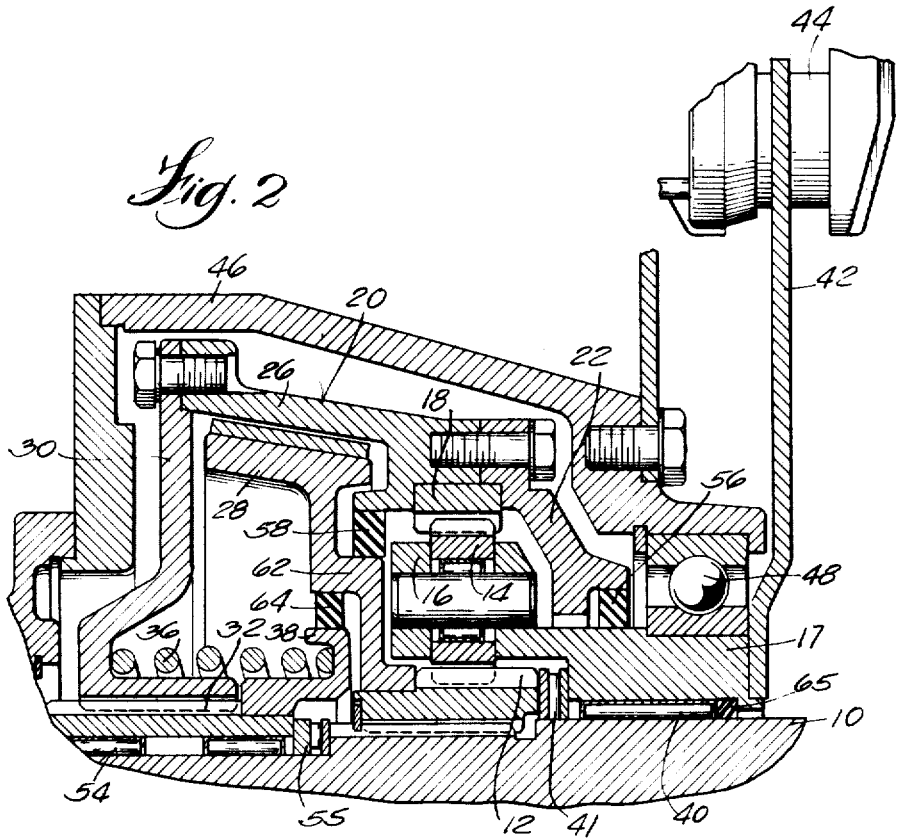
Fig. 2
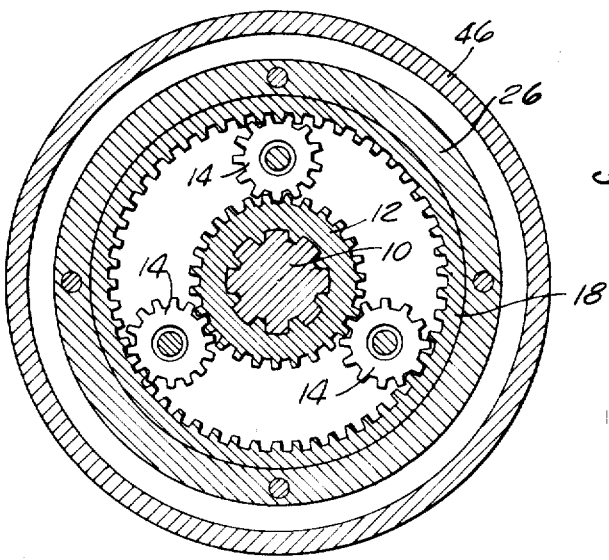
Fig. 3

REVERSING TRANSMISSION

BACKGROUND OF THE INVENTION

The field of the invention pertains to transmissions utilizing helical gear planetary mechanisms. Prior to the present invention, planetary helical gear mechanisms have been employed in transmissions as, for example, Graybill, U.S. Pat. No. 2,834,229 and further, the use of helical gears have been employed to cause automatic axial gear shift, as shown in Reis, U.S. Pat. No. 2,884,812.

SUMMARY OF THE INVENTION

The present invention utilizes a single brake component to accomplish the braking and subsequent reversal of direction of the output shaft of the transmission. In essence, this is accomplished by employing a caliper brake to stop the rotation of the planetary gear cage, to thereby impart axial movement to the ring gear carrier and disengage the clutch between the input shaft and the output shaft of the transmission. After disengagement of the clutch, power is transmitted through the planetary gear mechanism with the speed of rotation of the ring gear being reduced in accordance with the reduction in the speed of the cage, and with the direction of rotation of the ring gear and output shaft being reversed as the cage is brought to a stop.

In addition to the braking and reversing feature, the elements of the transmission are nested so as to provide a sealed enclosure for the gear and bearing components of the transmission yet to leave the clutch and brake equipment open and thus render them accessible for maintenance and service.

DESCRIPTION OF THE DRAWINGS

FIG. 2 is a partial cross sectional view with parts being broken away to show the clutch in the disengaged position; and FIG. 3 is a schematic end view of the transmission.

DESCRIPTION OF THE PREFERRED EMBODIMENT

Figure 1:
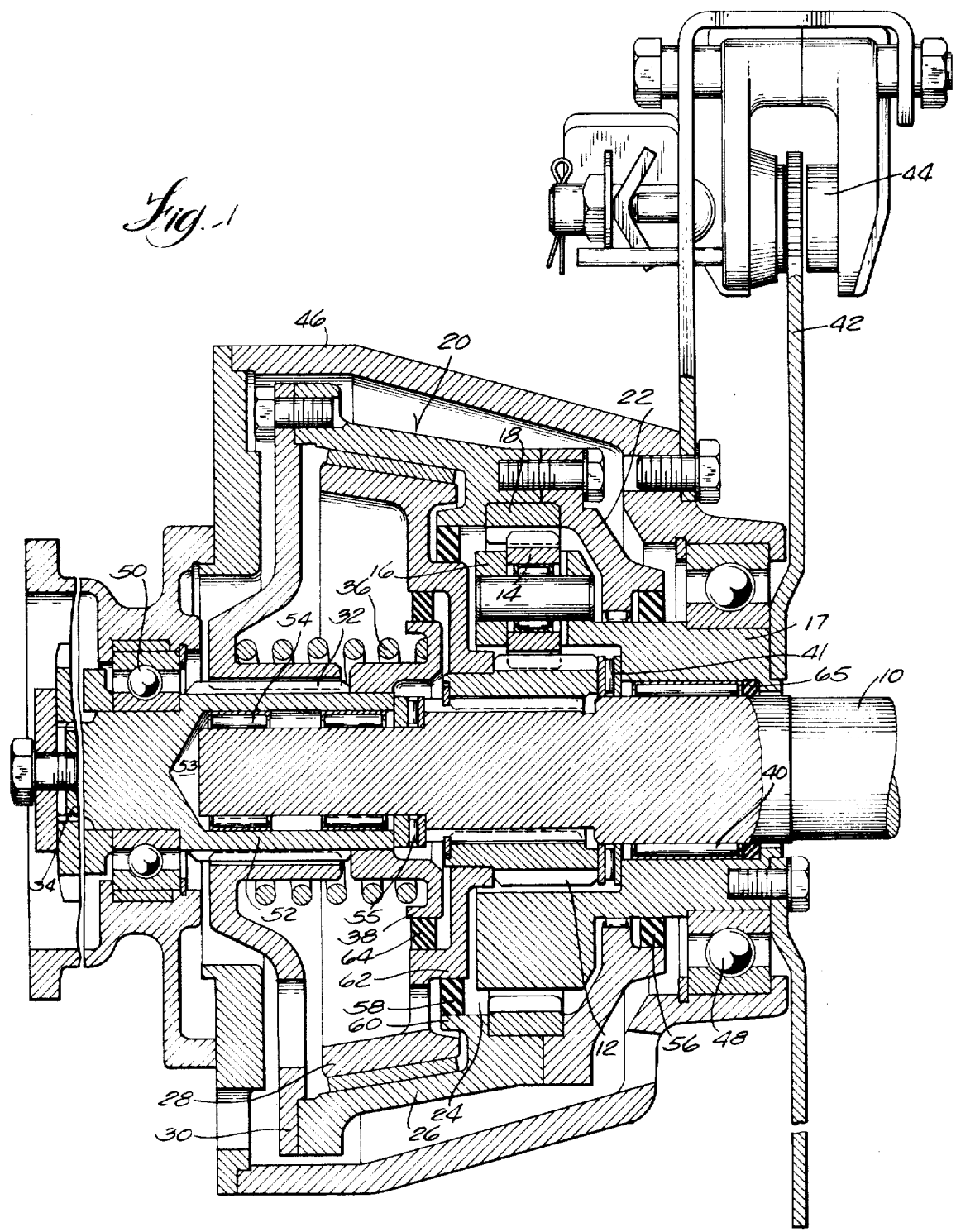
FIG. 1 is a cross sectional view of the reversing transmission embodying the present invention with the clutch being shown in the engaged position.

The planetary gear mechanism of the reversing transmission includes a powered input shaft 10, a sun gear 12 fixed to the input shaft, three planetary gears 14 which are carried by a cage 16 and a ring gear 18. All of the gears of the mechanism have helical teeth. The ring gear is fixed to a ring gear carrier 20 which is comprised of three sections; a gear housing section 22 which forms a part of a sealed enclosure 24 for the gears of the mechanism; a frustoconical clutch section 26 which is adapted to engage with the correspondingly shaped friction clutch member 28 which is fixed to the hub of the sun gear 12; and a hub section 30 which is provided with splines 32 which engage corresponding splines of the output shaft 34. The splined connection permits the carrier 20 to transmit rotational movement of the ring gear 18 to the output shaft and also permits the carrier to move in an axial direction in respect to the output shaft.

The carrier 20 is biased by a compression spring 36 towards the left (as shown in the drawings) to thereby force the clutch section 26 of the carrier into engagement with the clutch member 28. The spring 36 extends between a retainer ring 38, fixed to the output shaft 34, and the section 30 of the carrier.

The cage 16 has a hub 17 which is rotationally mounted on the input shaft 10 via bearings 40 and thrust bearing 41. A disc member 42 of the caliper brake mechanism is fixed to the end face of the hub 17 for rotation with the carrier. Brake shoes 44 of the mechanism are fixed to the transmission housing 46 which in turn is adapted to be fixed to the machine with which the transmission is to be used. The transmission housing 46 carries bearings 48 and 50 which are positioned between the housing and the hub 17 and the housing and the output shaft 34 respectively. A stub shaft portion 52 of the input shaft projects into a bore 53 of the output shaft which is provided with bearings 54 and 55 to permit the output shaft to rotate independently of the input shaft.

The heretofore described structure provides a sealed enclosure 24 for the meshing gears of the mechanism as well as for the bearings located between the output and input shafts, yet leaves the clutch and brake mechanisms exposed for easy access for maintenance or service purposes. The enclosure 24 is sealed by three annular seals; seal 56, which is carried by the housing section 22 and engages the hub 17 of cage 16, seal 58 which is carried by lip 60 of the clutch section 26 and engages flange 62 of the hub 63 of the clutch member 28, and seal 64 which carried on the inside surface of flange 62 and engages the outer rim of retainer ring 38. A further seal 65 is provided at bearing 40.

When the transmission operates under normal conditions, i.e. when output shaft 34 is to be driven in the forward direction, the spring 36 exerts a force on the ring gear carrier 20 in an axial direction towards the base of the frustoconical section of the clutch member 28. Since the carrier is free to move in this direction, the force of spring 36 biases the clutch section 26 of the ring gear carrier into frictional engagement with the clutch member 28. When the clutch is engaged, the input shaft 10 is directly connected to the output shaft via the clutch and the engaged splines 32 which are provided on the inside face of the hub section 30 and the outside face of the output shaft. Thus, the input and output shafts are fixed to each other and rotate at a 1:1 speed ratio. Because power is transmitted through the clutch during a forward or normal rotation of the output shaft, the planetary gear mechanism rotates as one unit without any relative movement between the sun, planetary and ring gears. Thus, during normal operation of the transmission, the planetary gear mechanism is non-operational and, of course, does not experience any wear and tear.

When braking, the shoes 44 of the caliper brake are engaged with the brake disc 42 to thereby initially slow down and eventually stop the rotation of the cage 16 in respect to the transmission housing 46 (or the machine in which the transmission is installed). As the brake is applied, the rotational speed of the cage 16 will become less than that of the input shaft 10, thus the sun gear 12 will cause rotation of the planetary gears 14 and in turn will cause a corresponding rotation of the ring gear 18. During initial braking, the ring gear will rotate in the same direction as the input shaft, however, its speed of rotation in respect to the speed of the input shaft will decrease in accordance with the decrease in speed of the brake disc 42 and cage 16. Because of the helical design of the teeth of the gears of the planetary mechanism, the reduction in the relative speed of rotation of the cage member will cause the ring gear 18 and its carrier 20 to simultaneously move axially in opposition to the bias of spring 36, thereby disengaging the clutch section 26 from clutch member 28, and causing further rotational movement of the input shaft to be transferred at a reduced speed to the output shaft via the splined connection 32.

Upon further braking, the rotation of the cage 16 will be stopped, i.e. the cage will become fixed. As the speed of the cage member approaches zero, the rotation of the ring gear will be stopped, and any further input from the input shaft will cause the ring gear to rotate in a direction opposite to the input shaft and thus cause a corresponding reverse rotation of the output shaft 34. The speed of reverse rotation of the output shaft will be dependent upon the speed of the input shaft.

As the brake is released, the spring 36 will exert a force on the ring gear carrier to move it into engagement with the clutch member 28 and to thus return to the direct coupling of the input shaft to the output shaft.

I claim:

1. A reversing transmission adapted to transfer forward rotation of an input shaft to an output shaft of the transmission and adapted to reduce the speed and reverse the rotation of the output shaft in respect to the rotation of the input shaft, comprising in combination:
    A. a planetary gear mechanism comprised of:
        a. a sun gear fixed to the input shaft;
        b. planetary gears carried by a cage; and
        c. a ring gear means driveably connected to the output shaft to transfer rotational movement of said ring gear to the output shaft;
    B. axial movement means permitting movement of said ring gear means in an axial direction in respect to the axes of the gears of said planetary gear mechanism;
    C. clutch means including:
        a. one clutch member connected for movement with the input shaft;
        b. a second clutch member connected for movement with said ring gear means; and
        c. spring means exerting a force on said ring gear means to normally bias said two clutch members into operative engagement with each other.
    D. brake means connected to said cage and operative to reduce the speed of rotation of said cage in respect to the speed of rotation of the input shaft and to stop said rotation of said cage in respect to the transmission independently of the rotation of the input shaft;
    E. said sun and planetary gears and said ring gear means having helical teeth to cause said ring gear means to move in an axial direction and in opposition to the force of said spring means upon reduction of speed of said cage in respect to the speed of the input shaft;
    F. said axial movement of the ring gear means causing disengagement of said two clutch members and permitting said ring gear means to reverse direction of rotation of the output shaft upon continued forward rotation of said input shaft upon stoppage of rotation of said cage.

2. A reversing transmission according to claim 1 wherein said ring gear means includes a ring gear and a ring gear carrier and wherein said axial movement means is comprised of spline means connecting said ring gear carrier to the output shaft.

3. A reversing transmission according to claim 2 wherein said second clutch member is provided on the inside face of said ring gear carrier.

4. A reversing transmission according to claim 3 wherein both of said clutch members have frustoconical mating surfaces.

5. A reversing transmission according to claim 4 wherein said spring means is comprised of a spring engaging at one of its ends with the output shaft and engaging at the other of its ends with said ring gear carrier to exert a force on said carrier in a direction towards the base of said frustoconical surfaces.

6. A reversing transmission according to claim 5 wherein said brake means includes a brake disc fixed to said cage member and brake engaging means fixed to the transmission and frictionally engaging said disc.

7. A reversing transmission according to claim 1 wherein the input and output shafts are co-axially aligned, and wherein said axial movement means is comprised of spline means between the output shaft and said ring gear means.

8. A reversing transmission according to claim 7 wherein a portion of the input shaft projects into an axial aperture of the output shaft, and wherein bearing means are provided between the inside wall of such aperture and said portion of the input shaft.

9. A reversing transmission according to claim 8 wherein said ring gear means is comprised of a ring gear and a ring gear carrier, and wherein said first clutch member is supported by a hub which is connected for rotation with the input shaft; a portion of said ring gear carrier forming in combination with portions of said hub and cage an enclosure for said sun, ring and planetary gears; and sealing means positioned between said ring gear carrier and said cage and between said carrier and said hub.

10. A reversing transmission according to claim 9 wherein said brake means and said first and second clutch means are positioned outside of said enclosure.

* * * * *